H. C. BULL.
Filter.
No. 209,454. Patented Oct. 29, 1878.
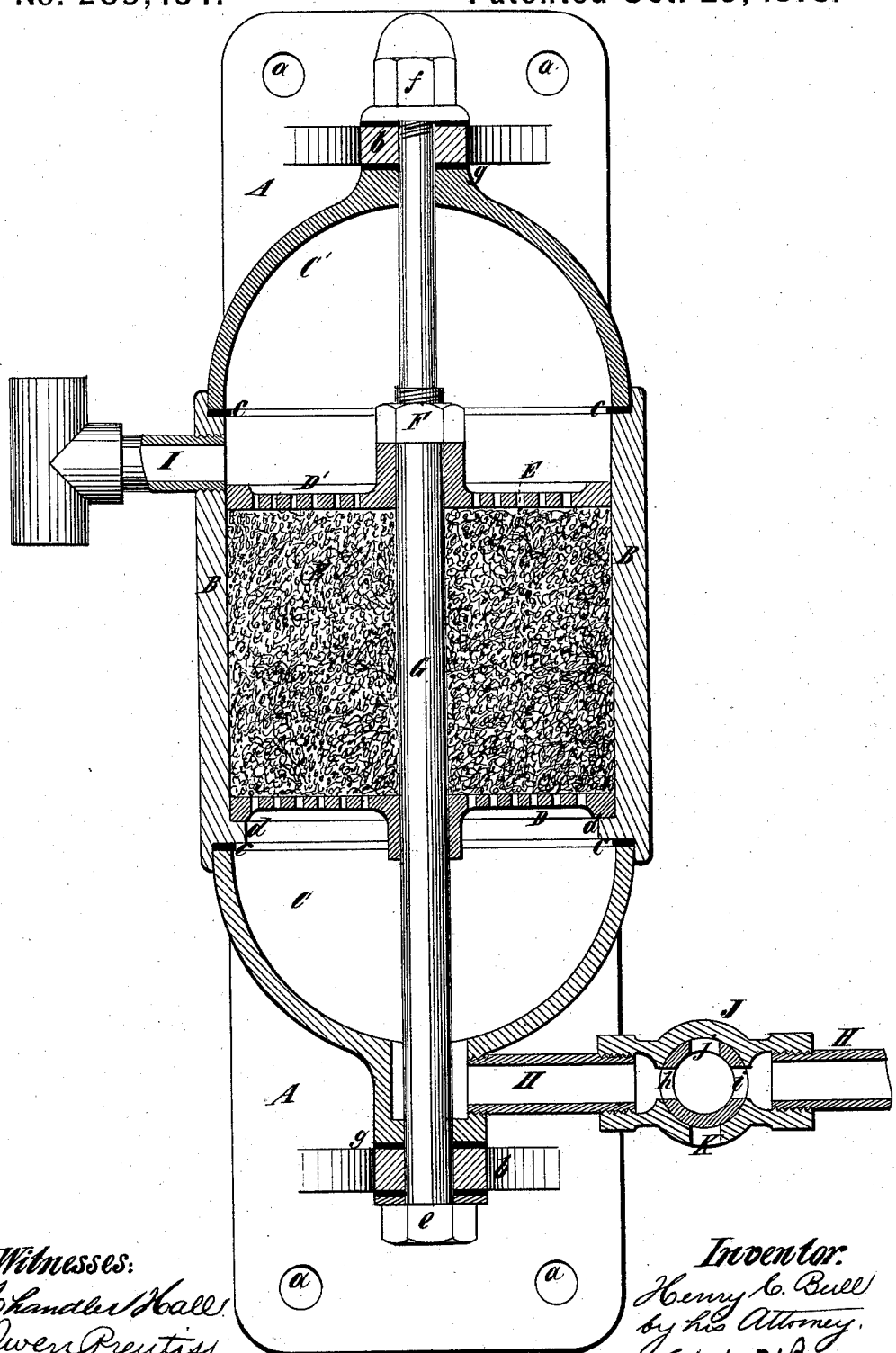
Witnesses:
Chandler Hall
Owen Prentiss
Inventor:
Henry C. Bull
by his Attorney
Edwin H. Brown

UNITED STATES PATENT OFFICE.

HENRY C. BULL, OF BROOKLYN, NEW YORK.

IMPROVEMENT IN FILTERS.

Specification forming part of Letters Patent No. 209,454, dated October 29, 1878; application filed July 17, 1878.

*To all whom it may concern:*

Be it known that I, HENRY C. BULL, of the city of Brooklyn, in Kings county, and State of New York, have invented a certain new and useful Improvement in Filters, of which the following is a specification:

My improvement consists in the combination, with a filter comprising a base-piece or support, a body, end pieces or heads therefor, perforated diaphragms, and a rod or bolt for securing the parts together, and provided with a supply-pipe and a delivery-pipe, of a single cock, so made and connected with the supply-pipe as to provide for washing out said filter by a flow of filtered liquid in a reverse direction to that in which the liquid flows when the filter is in use, whereby the filter is rendered very simple in construction and easy of operation.

The accompanying drawing represents a central vertical section of a filter and a cock and outlet embodying my improvements.

A designates a base or support for the filter, of a rectangular form, provided with holes $a$, in which screws may be inserted for the purpose of securing the filter in place, and provided near the ends with lugs $b$, for the reception of a rod or bolt, whereby the component parts of the filter are secured together, as will be presently described.

The shell or case of the filter consists of a cylindric body, B, of cast-iron or other suitable material, and hemispherical end pieces or heads, C C', either or both of which are made of transparent material, such as glass, and are fitted into rabbets in the ends of the shell B, packings $c$ being interposed to form tight joints.

D D' designate two perforated diaphragms, which may be made of metal, and are arranged within the body B. The lower diaphragm, D, rests upon a shoulder or ledge, $d$, in the shell B, and the upper diaphragm, D', rests upon the filtering material E, such as charcoal, interspersed between it and the other diaphragm, and is secured in position by a nut, F, on a rod or bolt, G. This rod or bolt G passes through the lugs $b$ of the support A, through the outer ends of the hemispherical end pieces or heads, C C', and through the diaphragms D D'. Therefore it secures all parts of the filter together in such a manner that they may be readily detached when desirable. Preferably the rod or bolt G has a head, $e$, at one end, and a screw-threaded nut, $f$, at the other, and packings $g$ are fitted on it outside the end pieces or heads, C C', to prevent leakage.

H designates the inlet or supply pipe for the filter, leading to and communicating with the lower end piece or head, C, and I designates the outlet-pipe leading from the upper portion of the cylindric body B above the upper diaphragm, D'.

The supply-pipe H is provided with a three-way cock, J, the key of which may be adjusted to establish communication between its ports $h\ i$ and the supply-pipe, to permit water to flow through the same into and through the filter, or to establish communication between its port $j$ and the section of the supply-pipe H, connecting it with the filter, and between its port $h$ and the outlet K, so as to permit the water in the filter to flow backward through the said outlet, so as to wash out and clean the filter, and accomplish this without detaching the filter or any of its parts.

It will be seen that by my invention I provide a simple, cheap, and desirable filter which can be readily cleaned out when desirable.

What I claim as my invention, and desire to secure by Letters Patent, is—

The combination of the support A, with its lugs $b$, body B, end pieces or heads, C C', diaphragms D D', rod or bolt G and its appurtenances, supply-pipe H, cock J, and delivery-pipe I, substantially as and for the purpose specified.

In testimony that I consider the improvement in filters above described to be my invention I hereunto subscribe my name this 19th day of June, 1878.

HENRY C. BULL.

Witnesses:
JOHN J. BAILEY,
AUG. J. WARNER.